Nov. 3, 1936.                W. A. MORTON                2,059,889
                              GLASS FEEDER
                           Filed June 28, 1930           2 Sheets-Sheet 1

INVENTOR
William A. Morton
by William B. Jaspert
Attorney.

Nov. 3, 1936.　　　W. A. MORTON　　　2,059,889
GLASS FEEDER
Filed June 28, 1930　　　2 Sheets-Sheet 2

INVENTOR
William A. Morton
by William B. Jaspert
Attorney

Patented Nov. 3, 1936

2,059,889

UNITED STATES PATENT OFFICE 2,059,889

GLASS FEEDER

William A. Morton, Pittsburgh, Pa.

Application June 28, 1930, Serial No. 464,493

4 Claims. (Cl. 49—56)

This invention relates to a method of and apparatus for feeding molten glass to ware forming machines of the suction type.

It is among the objects of the invention to deliver glass from a glass pool by raising a portion of the glass to a plane above the general level of the pool to effect contact with a suction mold.

Another object of the invention is to provide a glass gathering means which is adapted to raise a fresh gather of glass to the gathering position from the bottom of the pool where the glass will be free from cold portions, chilled tailings, or the like.

A further object of the invention is the provision of means for setting up circulating currents in the glass pool of a working tank or forehearth whereby fresh glass continuously approaches the gathering implement or feeder.

Molten glass solidifies immediately upon cooling and the present invention makes use of this characteristic of glass by subjecting a limited portion of a glass pool to heat loss by radiation, whereby a film of glass is formed on such portion. The film so formed is employed to raise a portion of the glass by surface tension to a level higher than the level of the glass pool and in the plane of operation of the suction molds of a ware forming machine.

It is common practice to employ a hollow pipe to form a gather for blowing glass. The mass of the glass gather is controlled by temperature of the glass either from the furnace or by applying cooling air directly on the gathering implement or the glass thereon.

The present invention provides apparatus for continuously gathering glass as a means for feeding the glass to suction forming molds and which shall utilize both mechanical and thermal means, or either of them, for controlling the rate of feeding or delivering the glass to the machine.

Figure 2:
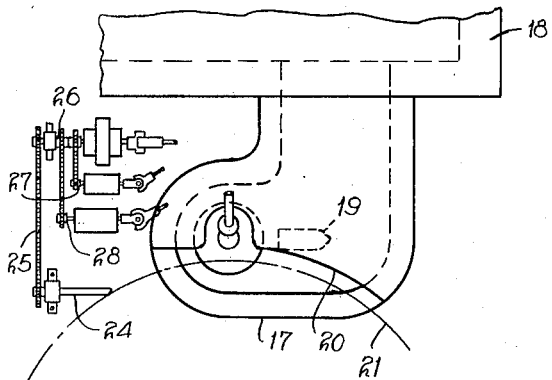
Figure 1:
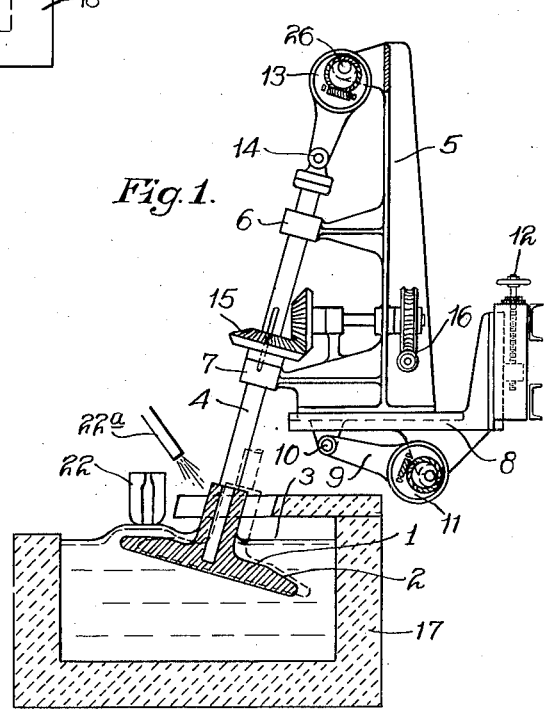
Figure 3:
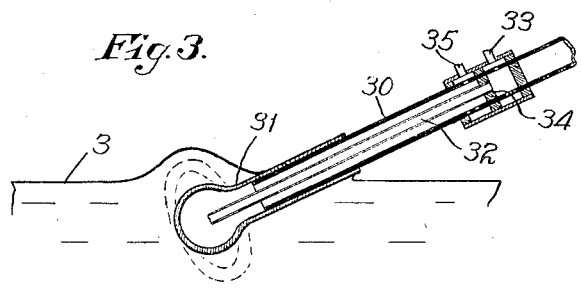
Figure 8:
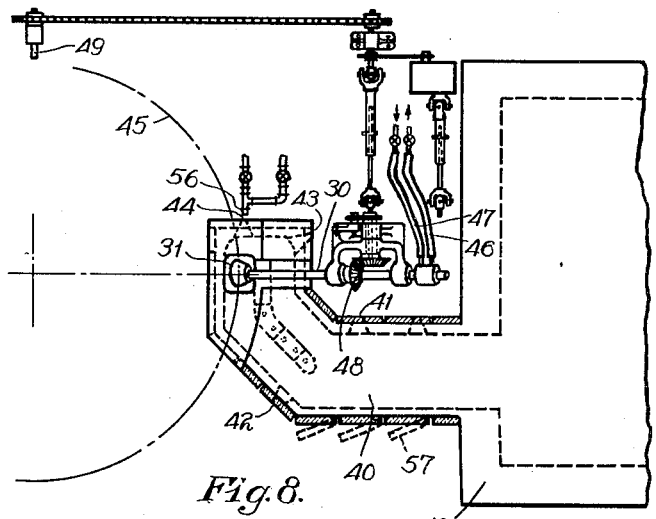
Figure 4:
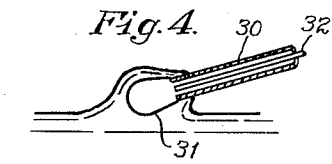
Figure 5:
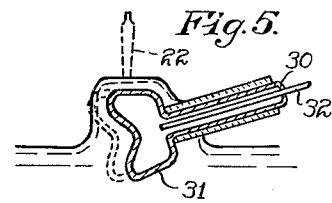
Figure 6:
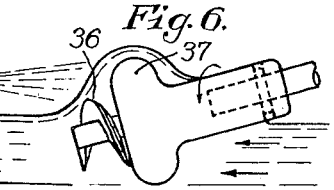
Figure 9:
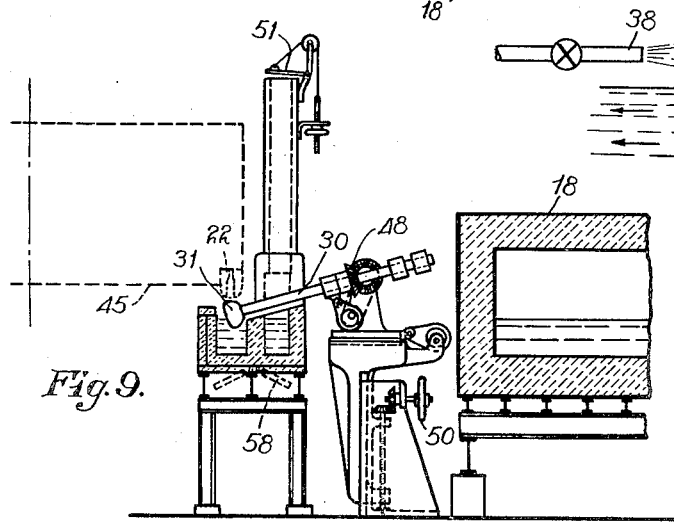
Figure 7:
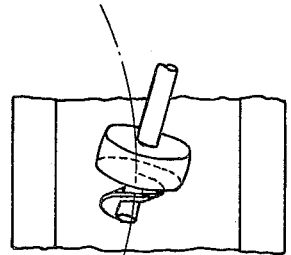
Figure 10:
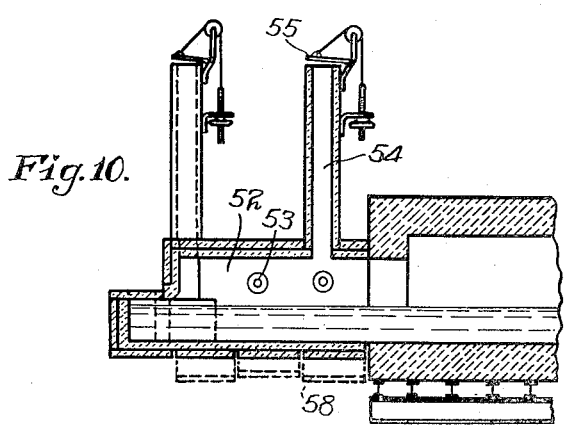

The nature of the invention will become more apparent from a consideration of the accompanying drawings in which like reference characters designate like parts and in which Fig. 1 is a sectional elevational view of a glass gathering device embodying the principles of this invention; Fig. 2 a plan view diagrammatically illustrating the glass gathering device and its operative relation to a suction forming machine; Figs. 3, 4 and 5 are sectional elevational views of a glass gathering implement which are modifications of that shown in Fig. 1; Figs. 6 and 7 are side elevational and top plan views, respectively, of still another modification of the gathering implement; Fig. 8 is a top plan view diagrammatically illustrating a forehearth of a glass tank and the operating mechanism of a gathering implement coordinated with a suction forming machine; Fig. 9 is a vertical section taken through the center line of Fig. 8; and Fig. 10 is a vertical section of the forehearth of a glass tank.

With reference to Figs. 1 and 2 of the drawings, the structure therein illustrated comprises a refractory disc 1 having a beveled edge 2 and having its axis disposed at an angle to bring the bevelled face in a horizontal position with respect to the surfaces 3 of a glass pool.

The refractory disc 1 is mounted on a spindle 4 by means of which it is adapted for rotation in the pool whereby the glass is continuously circulated from below the glass level to the top plane of the disk.

The spindle 4 is adapted for rotation by means of the following mechanism: A journal bracket 5 having bearings 6 and 7 is mounted for horizontal movement on a support 8. The member 5 is movable on its support by a link 9 pivoted at 10 and operated through an eccentric 11 to subject it to oscillating movement. The support 8 is mounted to be vertically adjustable by a screw mechanism 12. The spindle 4 is adapted for oscillating movement in an axial direction through an eccentric 13 pivotally connected to spindle 4 at 14. The spindle is rotated by bevel gear wheels 15 driven by a worm gear mechanism 16.

A refractory forehearth structure 17 comprises a container for the molten glass which is delivered from a tank 18, Fig. 2, and the glass pool is preferably maintained at a sufficient depth to provide the proper thermal condition of the glass to be worked therein.

As shown in Fig. 2, the forehearth structure is offset with respect to the passage leading to the glass tank and a block or baffle 19 may be provided to divide the pool in such manner that the glass will circulate around the disk 1 drawing the molten glass from the tank in the manner indicated by the arrow and delivering the same on the opposite side of the baffle 19 to cause it to move in the direction of the tank, thus assuring fresh glass being delivered to the gather implement. A cover 20 is provided to protect the glass pool from loss of heat due to radiation, but the foremost portion of the hearth is open, exposing the portion of the disk 1 which is in the uppermost position with the bevelled face 2 slightly above or in the plane of the surface level 3 of the glass pool.

The travel of the parison mold is indicated by the arc or line 21 and a parison mold 22 is shown in Fig. 1 directly above the disk 1. As the refractory disk is rotated in the pool, it will gather a mass of glass on its horizontal face 2 to raise the glass above the level 3 of the pool and in the plane of operation of the parison mold 2 which, by coming in contact with the glass, receives its charge and forms its parison without unduly contacting with the glass to cause the latter to chill.

With reference to Fig. 2, 24 designates a drive shaft connected with the operating mechanism of the ware forming machine which is diagrammatically illustrated by the line 21. A drive chain 25 connects a countershaft 26 with the drive shaft 24 and a plurality of driven shafts 27 and 28 are connected by chains with the shaft 26. As shown in Fig. 1, the shaft 26 operates the eccentric mechanism 13 to subject the spindle 4 to oscillation movement in an axial direction. The shaft 27 operates the worm gear drive 16 to rotate the spindle 4 and the shaft 28 drives the eccentric mechanism 11 which subjects the entire supporting member 5 to oscillating movement in a horizontal direction on the supporting bracket 8. With these movements circulation of the glass is positively assured and a fresh batch of glass is continuously delivered from the bottom to the top of the pool where it is drawn into the parison molds 22. By operatively connecting the countershaft 26 with the ware forming machine, the several movements of the feeder or gather are coordinated with the operation of the blow machine so that a new batch of glass is available every time a suction mold is moved to its charge position.

To provide against freezing of the glass around the shank of the refractory disk 1, a burner 22a may be provided to direct a flame on the shank or an electric resistor heater (not shown) may be built into the shank to maintain it at the working temperature of the glass.

In the forms of the gather illustrated in Figs. 3, 4, and 5 of the drawings, a hollow tube 30 is provided with a suitable heat resisting end member 31 which may be constructed of a suitable alloy or of refractory material and is preferably of spherical or bulb form as shown in the several figures of the drawings referred to.

Within the tube 30 is provided a tube 32 leading to a passage 33 constituting an inlet for a source of cooling air and the tube 30 is sealed off by a spacing baffle 34 to constitute a chamber connecting with an outlet passage 35 leading to the atmosphere or exhaust.

In operation, the tube 30 is subjected to a rotary movement by suitable mechanism and air is blown into the tube to cool the lower end of the member 31 whereby a bulb of glass is gathered and projected above the level of the glass pool where it is in the plane of contact of the parison molds 22. In Fig. 5 the tube 30 is provided with a refractory material 30a at the end adjacent the member 31.

In Figs. 6 and 7, a modified form of gather is illustrated which is provided with a screw 36 having a tendency to feed the glass axially in the direction of the enlarged portion 37. A cold air blast may be applied through a conduit 38 instead of interiorly through the tube as shown in Fig. 3, for the purpose of controlling the mass of glass on the end of the rotating member.

As shown in Figs. 8 and 9, of the drawings, the forehearth structure 40 may be provided with burner ports 41, 42, 43 and 44 through which a heating flame is injected into the glass to maintain it at suitable working temperatures, and the gather 31, as illustrated in Fig. 3, extends into a forward portion of the tank in line with the path of travel of the parison molds, as indicated by the arc 45.

The end of the tubular spindle 30 is provided with connections 46—47 leading to a source of air supply and to an exhaust. The spindle is operatively connected through a suitable gear drive mechanism 48 with the drive shaft 49 of the ware forming machine. An adjustable screw mechanism 50 is provided as shown in Fig. 9 to regulate the depth of contact of the glass gather device in the glass pool and heat regulation is obtained through an adjustable damper 51.

As shown in Fig. 10, the forehearth structure 52 may be provided with burner ports 53 and exhaust flues 54, the latter being regulated through dampers 55 in a well known manner to establish circulation of heat from the front to the rear of the forehearth.

In Figs. 8 to 10 the forehearth is provided with movable wall sections 57 on the side walls as in Fig. 8 and bottom sections 58 in Figs. 9 and 10. The movable sections provide for temperature regulation of the glass in the pool by control of heat radiation from the walls.

In Fig. 8 an injector 56 is shown in alinement with the port 44. The injector is connected by two pipe lines, one leading to a source of cooling air and the other to a fuel supply to either heat or cool the glass at the point of gather in the forehearth.

In operation, of the gathering mechanism, the glass is gathered on the end of the refractory element such as the disk 1 by subjecting a portion of the glass to a reduction of temperature by heat radiation whereby it forms a film the surface tension of which supports a mass of glass of sufficient size to feed a parison mold when raised in contact therewith and the mass of the glass so delivered may be sufficient to retain the gathering implement in a fixed position with respect to the surface level of the glass or to require that it be oscillated by means of mechanism as shown in Fig. 1.

The mass may be further controlled by the cooling medium passing through the member 30' or by external temperature control which is effective either through the cooling medium applied in the manner shown in Fig. 6 or by means of heating gases to prevent excess accumulation of the glass mass.

By means of the glass gathering and feeding means herein provided, a clean mass of glass is provided for the successive charges of the parison molds as they move in register with the feeder and the glass in the pool is continuously circulated to cause the chilled glass portion if any in the pool to travel towards the rear of the forehearth where it is reconditioned for use.

Although several embodiments of the invention have been herein illustrated and described, it will be obvious to those skilled in the art that various modifications may be made in the details of construction without departing from the principles herein set forth.

I claim:

1. Means forming a continuous hollow glass gathering implement comprising a hollow rotary shaft adapted to engage the surface of a pool of molten glass and accumulate a quantity of glass thereon, cooling air supply means in said shaft to control the forming of a hollow glass bulb on the end of said shaft and valves associated therewith to regulate the air supply to condition the said bulb thermally and regulate the size thereof.

2. In apparatus for supplying molten glass mold charges to a vacuum type ware forming machine, a container for the glass, a partition wall in the container dividing the container into a supply channel and a return channel and means for rotating an implement in the glass in return channel on an inclined axis to draw glass from the supply channel then raise it to the mold station and by continued rotation move it from said station through the return channel.

3. A glass gathering implement adapted to deliver molten glass charges to a suction parison mold from a pool of molten glass in a container, supporting walls extending above the glass in the said container, a plurality of suction parison molds above the said glass supporting walls, and means submerged in the glass pool and rotatable therein for causing movement of the glass in an axial and angular direction to raise the glass above the surface of the pool in the path of movement of the suction parison mold.

4. Apparatus for delivering successive charges of molten glass to suction forming machine molds comprising a container for the glass, an implement mounted for rotation on an inclined axis in the glass, means for rotating the implement to lift the glass to a suction mold gathering station in contact with the mold, and means associated with said container and cooperating with said rotating implement for returning the glass remaining on the implement back to the container independently of movement of the suction molds.

WILLIAM A. MORTON.